April 6, 1937.  E. E. ENGELHARDT ET AL  2,076,268
OVEN SWITCH
Filed Aug. 13, 1934
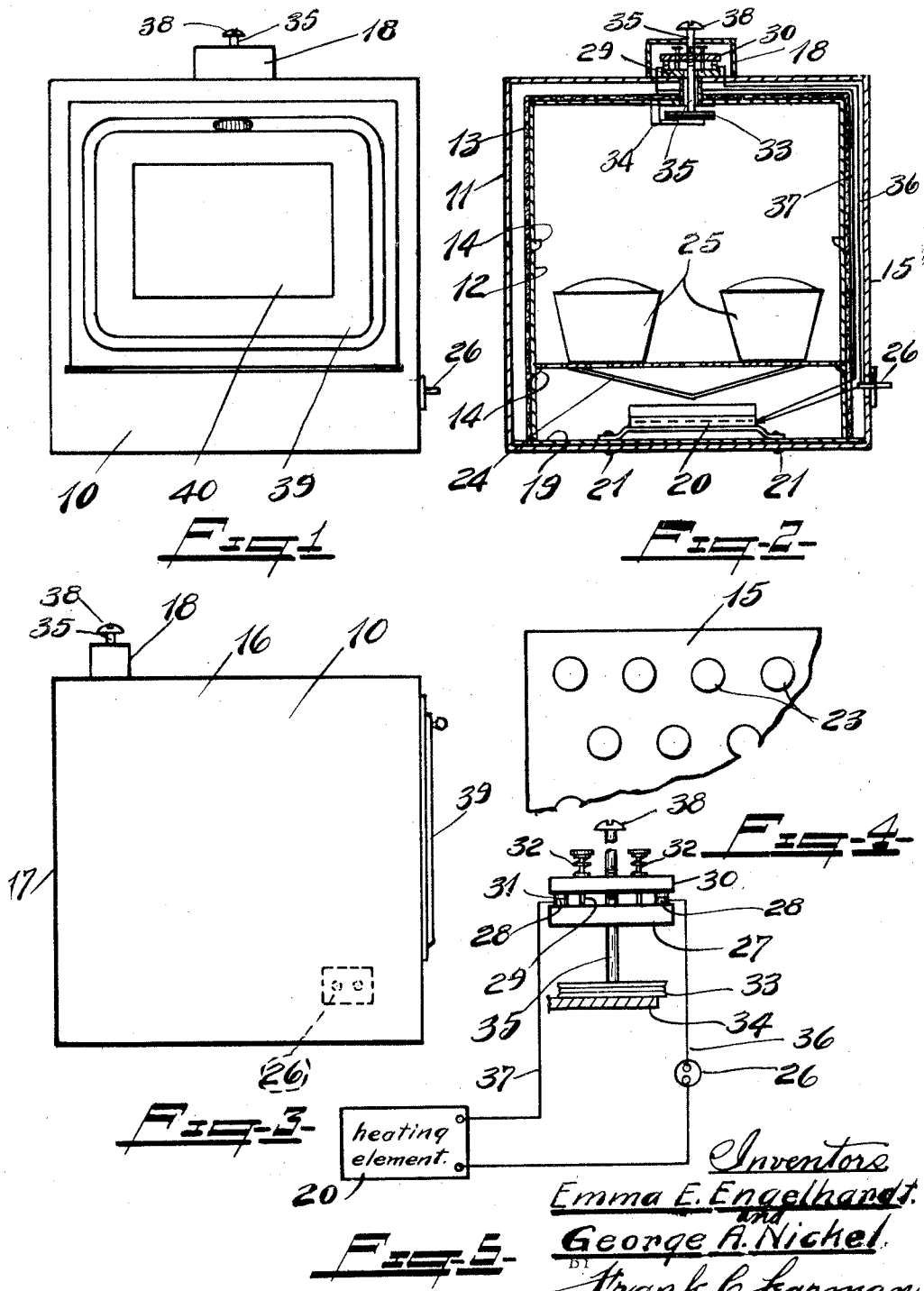
Inventors
Emma E. Engelhardt
George A. Nichel
BY Frank C. Sarman
ATTORNEY.

Patented Apr. 6, 1937

2,076,268

UNITED STATES PATENT OFFICE 2,076,268

OVEN SWITCH

Emma E. Engelhardt, Flint, and George A. Nickel, Bay City, Mich.

Application August 13, 1934, Serial No. 739,548

1 Claim. (Cl. 200—140)

This invention relates to ovens and more specifically to dough proofing ovens.

The prime object of the invention is to provide a simple, practical, and inexpensive proofing oven embodying electrical means for providing a constant temperature to facilitate the proofing of dough.

Another object is to provide a thermostat which is influenced by the temperature in the oven for automatically regulating and controlling said temperature.

A further object is to provide simple and practical adjustable means to permit the varying of the temperature in said container and which can be easily operated.

A still further object is to design an oven or container of simple construction which can be constructed either as a separate unit or which can be built integral with a conventional kitchen cabinet, which is economical in operation and light in weight.

With the above and other objects in view, the present invention consists of the combination and arrangement of parts, hereinafter more fully described, illustrated in the accompanying drawing, and particularly pointed out in the appended claim, it being understood that changes may be made in the form, size, proportion, and minor details of construction, without departing from the spirit, or sacrificing any of the advantages of the invention.

In the drawing—

Fig. 1 is a front elevation of our dough proofing oven showing it constructed as an independent unit.

Fig. 2 is a sectional front elevation.

Fig. 3 is a side elevation.

Fig. 4 is an enlarged fragmentary plan view of one of the trays.

Fig. 5 is a wiring diagram, also showing the heating element, thermostat, and switch.

It is general practice when dough has been mixed and set for raising, to place it on a convenient shelf or table for the necessary period of time to permit full expansion; during this period, and prior to the actual baking, it generally forms a dry crust. This crusting is due to the fact that there are always air currents and drafts in the room in which the baking is carried on, caused by the windows being open or by the house doors being opened and closed; consequently, the temperature of the room in which the dough is "set" cannot be maintained at a predetermined temperature due to the causes above mentioned, and further due to the heating system in the home, and we have, therefore, perfected a very simple, practical, and efficient proofing oven which eliminates the yeast odor usually present in the room where the dough is "set", as well as the objections above referred to. This proofing oven also assures maximum expansion of the dough and elimination of the crust, so that the goods when baked will have a fine uniform texture and a good uniform color.

Referring now more particularly to the drawing in which we have shown the preferred embodiment of our invention, the numeral 10 indicates the dough proofing oven or cabinet. This comprises the spaced apart sheet metal walls 11 and 12 respectively, a relatively thin layer of insulating material 13 being secured to the inner walls 12 in any approved manner, and these inner walls are also formed with inwardly projecting lugs 14, and on which the trays 15 are removably supported as usual.

The top and back walls 16 and 17 respectively are also formed in a similar manner, and a switch and regulating mechanism 18 is mounted on the top wall as will be hereinafter more fully described.

A panel 19 of insulating material covers the bottom of the oven, and a heating element 20 is secured thereto by means of bolts 21, a relatively heavy heat retaining member 22 being provided for retaining the heat.

The trays 15 are preferably perforated as shown at 23 in Fig. 4 to permit the heat to circulate freely in the oven, and a shield 24 is secured to the underside of the bottom tray so that the pans of dough 25 which may be placed on the lower tray will not be subjected to higher temperature than the pans placed on the upper tray.

A suitable plug or socket 26 is secured to the side wall of the oven for connection to a suitable source of electrical supply as usual, such as the wiring of the house or building.

The make and break switch mechanism 18 is mounted on the top of the oven and includes an insulated bar 27 provided with contacts 28 as usual. Guides 29 are provided on said bar, and an insulated bar 30 is movably mounted thereon and is also formed with contacts 31, springs 32 being interposed between the heads of the guides and the member 30, and for a purpose to be presently described. An expansible thermostat 33 is mounted in a supporting guard 34 provided in the oven, and is operatively connected to the switch, a vertically disposed rod 35 being secured thereto, said rod projecting through the casing and insulated bar 27, and is threaded at a point intermediate its length to the threaded opening in the bar 30.

Leads 36 and 37 respectively are connected to the switch bar contacts, the lead 36 being connected to the plug 26, thence leading to one of the contacts on the heating element, the lead 37 leading down and being connected to the opposite contact on the heating element and forming an electrical circuit, and as the temperature raises beyond a predetermined point, the thermostat expands and raises the bar 30 accordingly, disconnecting the switch until the temperature has dropped, the springs 32 forcing the bar 30 downwardly and the switch to closed position to again energize the heating element, so that the oven temperature is automatically controlled at all times.

The end of the rod 35 projects beyond the switch box, and the head 38 is fashioned to receive a screw driver as usual, and it will be obvious that the temperature can be set by adjustment of said screw.

A door 39 forms a closure for the front of the oven and is provided with a transparent panel 40 so that the oven contents can be inspected from time to time.

From the foregoing description it will be obvious that we have perfected a very simple, practical, and inexpensive dough proofing oven, which is automatically controlled and which is economical to operate.

What we claim is:

A switch for dough proofing ovens and adapted to be mounted on the outside thereof and to be connected to a heating element and to a source of electrical supply, said switch comprising an insulated bar provided with spaced apart contacts, vertical guides on said bar, and a second insulated bar slidably mounted on said guides, contacts on this second bar, springs interposed between the heads of said guides and the second insulated bar, a thermostat mounted in the oven, and a rod connected to and projecting from said thermostat and having threaded engagement with said second insulated bar for adjusting the position of one bar with relation to the other and for opening or closing said switch as the thermostat is actuated.

EMMA E. ENGELHARDT.
GEORGE A. NICKEL.